(12) United States Patent
Asnaashari et al.

(10) Patent No.: US 9,979,540 B2
(45) Date of Patent: May 22, 2018

(54) SYSTEM AND METHOD FOR UPDATING READ-ONLY MEMORY IN SMART CARD MEMORY MODULES

(71) Applicant: Micron Technology, Inc., Boise, ID (US)

(72) Inventors: Mehdi Asnaashari, Danville, CA (US); Ruchirkumar D. Shah, San Jose, CA (US); Sylvain Prevost, Austin, TX (US); Ksheerabdhi Krishna, Cedar Park, TX (US)

(73) Assignee: Micron Technology, Inc., Boise, ID (US)

( * ) Notice: Subject to any disclaimer, the term of this patent is extended or adjusted under 35 U.S.C. 154(b) by 0 days. days.

(21) Appl. No.: 14/738,423

(22) Filed: Jun. 12, 2015

(65) Prior Publication Data

US 2015/0280912 A1  Oct. 1, 2015

Related U.S. Application Data

(63) Continuation of application No. 14/256,634, filed on Apr. 18, 2014, now Pat. No. 9,088,418, which is a
(Continued)

(51) Int. Cl.
*G06K 19/00* (2006.01)
*H04L 9/08* (2006.01)
(Continued)

(52) U.S. Cl.
CPC .......... *H04L 9/0877* (2013.01); *G06F 3/0619* (2013.01); *G06F 3/0655* (2013.01);
(Continued)

(58) Field of Classification Search
USPC ......................... 235/435, 439, 451, 487, 492
See application file for complete search history.

(56) References Cited

U.S. PATENT DOCUMENTS 5,623,637 A    4/1997  Jones et al.
5,901,311 A    5/1999  Labatte et al.
(Continued)

FOREIGN PATENT DOCUMENTS

CN    102307188       1/2012
EP     1549020 A2     6/2005
(Continued)

OTHER PUBLICATIONS

Mavrogiannopoulos, et al., ""Security implications in Kerberos by the introduction of smart cards"", ASIACCS '12: Proceedings of the 7th ACM Symposium on Information, Computer and Communications Security; Publisher: ACM, Apr. 2012, pp. 1-5.
(Continued)

*Primary Examiner* — Matthew Mikels
(74) *Attorney, Agent, or Firm* — Dorsey & Whitney LLP

(57) ABSTRACT

A storage device contains a smart-card device and a memory device, both connected to a controller. The storage device may be used in the same manner as a conventional smart-card device, or it may be used to store a relatively large amount of data in various partitions. One of these partitions may be a read-only partition that is normally accessible only for read accesses. However, it may sometimes be necessary to update or supplement the data stored in the read-only partition. This is accomplished by a host issuing an appropriate command to the storage device, which may be accompanied by an identifier for an appropriate level of authorization. The controller then changes the attribute of the read-only partition from "read-only" to "read/write" to allow data to be written to the partition. Upon completion, the controller changes the attribute of the partition back to read-only.

9 Claims, 3 Drawing Sheets

Related U.S. Application Data continuation of application No. 13/610,492, filed on Sep. 11, 2012, now Pat. No. 8,746,578, which is a continuation of application No. 11/938,726, filed on Nov. 12, 2007, now Pat. No. 8,286,883.

(51) Int. Cl.
  *G06F 12/14* (2006.01)
  *G06F 21/79* (2013.01)
  *G06F 12/02* (2006.01)
  *H04L 9/32* (2006.01)
  *G06F 3/06* (2006.01)

(52) U.S. Cl.
  CPC ........ *G06F 3/0679* (2013.01); *G06F 12/0238* (2013.01); *G06F 12/1425* (2013.01); *G06F 21/79* (2013.01); *H04L 9/0863* (2013.01); *H04L 9/3234* (2013.01); *G06F 2206/1014* (2013.01)

(56) References Cited

U.S. PATENT DOCUMENTS

| | | | |
|---|---|---|---|
| 6,330,653 B1 | 12/2001 | Murray et al. | |
| 7,162,645 B2 | 1/2007 | Iguchi et al. | |
| 7,370,166 B1 | 5/2008 | Ramesh et al. | |
| 7,529,807 B1* | 5/2009 | King | G06F 9/4416 709/217 |
| 7,953,985 B2 | 5/2011 | Nishimura et al. | |
| 8,156,322 B2 | 4/2012 | Asnaashari et al. | |
| 8,162,227 B2 | 4/2012 | Asnaashari et al. | |
| 8,286,883 B2 | 10/2012 | Asnaashari et al. | |
| 8,504,849 B2 | 8/2013 | Jogand-Coulomb et al. | |
| 8,746,578 B2* | 6/2014 | Asnaashari | G06F 12/1425 235/487 |
| 8,930,711 B2 | 1/2015 | Asnaashari et al. | |
| 9,483,632 B2 | 11/2016 | Asnaashari et al. | |
| 2001/0041593 A1 | 11/2001 | Asada | |
| 2003/0154355 A1 | 8/2003 | Fernandez | |
| 2004/0059916 A1 | 3/2004 | Mizushima et al. | |
| 2004/0088562 A1 | 5/2004 | Vassilev et al. | |
| 2004/0103288 A1 | 5/2004 | Ziv et al. | |
| 2004/0143730 A1 | 7/2004 | Wen et al. | |
| 2004/0149827 A1 | 8/2004 | Zuili | |
| 2004/0232247 A1 | 11/2004 | Tsunoda et al. | |
| 2004/0255145 A1* | 12/2004 | Chow | G06F 12/1466 726/16 |
| 2005/0035200 A1 | 2/2005 | Hendrick | |
| 2005/0045717 A1 | 3/2005 | Rager et al. | |
| 2005/0086471 A1 | 4/2005 | Spencer | |
| 2005/0279826 A1 | 12/2005 | Merrien | |
| 2006/0043202 A1 | 3/2006 | Kim et al. | |
| 2006/0117190 A1 | 6/2006 | Morita | |
| 2006/0126422 A1 | 6/2006 | Takagi et al. | |
| 2006/0138217 A1 | 6/2006 | Connelly et al. | |
| 2006/0174352 A1 | 8/2006 | Thibadeau | |
| 2006/0184806 A1 | 8/2006 | Luttmann et al. | |
| 2006/0198515 A1 | 9/2006 | Forehand et al. | |
| 2006/0218331 A1 | 9/2006 | James | |
| 2006/0242151 A1 | 10/2006 | Jogand-Coulomb et al. | |
| 2006/0289659 A1 | 12/2006 | Mizushima | |
| 2007/0002612 A1 | 1/2007 | Chang et al. | |
| 2007/0043667 A1 | 2/2007 | Qawami et al. | |
| 2007/0101418 A1 | 5/2007 | Wood et al. | |
| 2007/0106581 A1 | 5/2007 | Mitchell et al. | |
| 2007/0113097 A1 | 5/2007 | Wang | |
| 2007/0214369 A1 | 9/2007 | Roberts et al. | |
| 2007/0228154 A1 | 10/2007 | Tran | |
| 2007/0272752 A1 | 11/2007 | Nakatsugawa et al. | |
| 2008/0052532 A1 | 2/2008 | Akkar et al. | |
| 2008/0162784 A1 | 7/2008 | Obereiner et al. | |
| 2009/0121028 A1 | 5/2009 | Asnaashari et al. | |
| 2009/0121029 A1 | 5/2009 | Asnaashari et al. | |
| 2009/0254715 A1* | 10/2009 | Jeong | G06F 12/0292 711/153 |
| 2010/0023747 A1 | 1/2010 | Asnaashari et al. | |
| 2010/0229004 A1 | 9/2010 | Asnaashari | |
| 2010/0313277 A1 | 12/2010 | Pepin et al. | |
| 2012/0191975 A1 | 7/2012 | Asnaashari et al. | |
| 2012/0204018 A1 | 8/2012 | Asnaashari et al. | |
| 2013/0010519 A1 | 1/2013 | Asnaashari et al. | |
| 2013/0138972 A1 | 5/2013 | Asnaashari et al. | |
| 2014/0229745 A1 | 8/2014 | Asnaashari et al. | |
| 2015/0156022 A1 | 6/2015 | Asnaashari et al. | |
| 2015/0280912 A1 | 10/2015 | Asnaashari | |

FOREIGN PATENT DOCUMENTS

| | | |
|---|---|---|
| EP | 1577780 A1 | 9/2005 |
| EP | 2525595 A1 | 11/2012 |
| JP | 62-236055 | 10/1987 |
| JP | 08-167013 | 6/1996 |
| JP | 2001-320768 A | 11/2001 |
| JP | 2002-229861 | 8/2002 |
| TW | I234785 | 6/2004 |
| TW | 200623121 A | 7/2006 |
| WO | 2004055680 A1 | 7/2004 |
| WO | 2006120938 A1 | 6/2006 |
| WO | 2006/101292 A1 | 9/2006 |
| WO | 2008008326 A2 | 1/2008 |
| WO | 2009/064631 A2 | 5/2009 |
| WO | 2009/064634 | 5/2009 |

OTHER PUBLICATIONS

Summons to Attend Oral Proceedings Pursuant to Rule 115(1) EPC dated Oct. 5, 2017 for European Application No. 08848669.1.
EP Examination Report for Appl No. 08848669.1 dated Aug. 12, 2013.
First Office Action dated May 30, 2012 for application No. 097143735.
TW Office Action and Search Report for TW Application No. 097143737 dated May 29, 2012.
Extended European Search Report dated Jul. 19, 2011 for European Patent Application No. 08848669.1, 6 pgs.
International Search Report and Written Opinion dated Apr. 30, 2009 for International Application No. PCT/US2008/082259, 11.
International Search Report and Written Opinion dated Jun. 12, 2009 for International Application No. PCT/US2008/082274.
International Search Report and Written Opinion dated May 29, 2009 for International Application No. PCT/US2008/082312, 10 pgs.
Office Action dated Feb. 6, 2013.
PCT search report for International application No. PCT/US2008/082259 dated Apr. 30, 2009.
Extended Search Report issued for Appln No. EP 08849194.9 dated Jan. 24, 2013.
Received Extended Search report dated Jan. 7, 2013 for EP appln No. 08850219.0.
Wu, et al., "A Low Cost and Inner-Round Pipeline Design of ECB-AES-256 Crypto Engine for Solid State Disk", 2010 Fifth IEEE International Conference on Networking, Architecture, and Storage, p. 485-491.
Yang, Hsin-Jung et al., "Authenticated storage using small trusted hardware", CCSW '13: Proceedings of the 2013 ACM workshop on Cloud computing security workshop; ACM, Nov. 2013, 35-46.

* cited by examiner

SYSTEM AND METHOD FOR UPDATING READ-ONLY MEMORY IN SMART CARD MEMORY MODULES

CROSS REFERENCE TO RELATED APPLICATIONS

This application is a continuation of pending U.S. patent application Ser. No. 14/256,634 filed Apr. 18, 2014, which is a continuation of U.S. patent application Ser. No. 13/610,492, filed on Sep. 11, 2012, and issued as U.S. Pat. No. 8,746,578 on Jun. 10, 2014, which is a continuation of U.S. patent application Ser. No. 11/938,726, filed Nov. 12, 2007, and issued as U.S. Pat. No. 8,286,883 on Oct. 16, 2012. These applications and patent are incorporated herein by reference, in their entirety, for any purpose.

TECHNICAL FIELD

Embodiments of the present invention relate generally to smart-card devices, and, more particularly, to modules containing smart-card devices and memory devices having read-only memory.

BACKGROUND OF THE INVENTION

Chip cards or integrated circuit cards, both of which are commonly known as smart-cards, TPM (trusted platform Module) ICs, or the like, are devices with an embedded integrated circuit, such as a processor and/or limited capacity, non-volatile memory device. The memory device may be an EEPROM (electrically erasable programmable read-only memory) or the like, and it may store an operating system for the processor as well as smart-card applications, such as electronic banking applications, telephone applications in the case of SIM (subscriber identity module) smart-cards, or the like. The memory device may also store user authentication protocols, personalization data, such as telephone or bank account data or the like, user data, such as financial data or the like, private data, certificates or signatures used in various encryption techniques, etc. User data may be secured using a PIN (personal identification number) or a password as an access control measure. In order to access the protected data stored in the card's memory device, a user must be authenticated by providing the correct PIN or password.

FIG. 1 is a block diagram of a prior art integrated circuit, such as an integrated smart-card device 100, a SIM card, an electronic transaction card, an electronic identification card, a trusted platform Module ("TPM"), or the like, of the prior art. A central processing unit ("CPU") 105 is embedded in smart-card device 100 and may include a processor 110 and an integrated random access memory ("RAM") 120, a non-volatile memory 115, such as an EEPROM or flash memory, and a read-only memory ("ROM") 125. The processor 110 may include a cryptography engine 126, such as an advanced encryption system ("AES") encryption engine, as a portion of access control circuitry of CPU 105, that can perform AES protocols, user authentication protocols, such as Public Key Infrastructure ("PKI") authentication, encryption and decryption of data, etc. An input/output interface 127 is in communication with the CPU 105 and may be a USB (universal serial bus) interface for connecting directly to a host 118, such as a personal computer, a contactless interface, an ISO 7816 interface for use with an ISO 7816 card reader, etc. The ROM 125 typically stores the operating system of smart-card device 100. The smart-card device 100 may also include a file management system 130 that may be used to manage the address space of the non-volatile memory 115, and a key management system 135 for managing and storing one or more encryption and/or decryption keys, such as one or more AES encryption and/or decryption keys or the like. The non-volatile memory 115 or the key management system 135 may store private keys, certificates that may include public keys as part of public/private key encryption, applications, such as electronic banking applications, telephone applications, etc. The non-volatile memory 115 may further include upgrades or patches for the smart-card operating system.

During operation, the smart-card device 100 is placed in communication with a host 118 via a card reader, for example. An identifier, such as PIN or password, is input into the host 118 by as user. The reader may then pass the user-entered identifier on to the smart-card device 100 for verification so that the smart-card can authenticate the user. The smart-card device 100 then indicates to the host 118 that the user is either authenticated or not authenticated. Alternatively, the smart-card device 100 may be in direct communication with the host 118 via a USB interface, for example. In which case, the identifier is input into the host 118 and is then passed directly to the smart-card device 100 via the USB interface for authentication of the user. After user authentication, the processor 110 either decrypts data from the non-volatile memory 115 for output to the host 118, or it encrypts data received from the host 118 for storage in the non-volatile memory 115, e.g., using one or more encryption and/or decryption keys, such as AES keys, from the key management system 135.

Although the smart-card device 100 includes the non-volatile memory 115, the capacity of the memory 115 is normally very limited. Therefore, larger and more costly embedded integrated memory may be needed in order to meet a demand for increased storage capacity for storing additional and/or more complex applications, user data, etc. This could be provided by including a separate non-volatile memory device packaged with, and coupled to, the smart-card device 100.

If such memory was provided, the memory might be partitioned, and at least one of the partitions might be designated for storing data that should be protected from being overwritten or erased either generally or by specific classes of individuals. The data in this read-only partition might be either instructions that are executed by the processor 110 or data that, for one reason or another, should not be overwritten by a user. For example, if the data were instructions for an application executed by the processor 110 in the smart-card device 105, inadvertent erasure of the instructions would make the application unusable. The data might be stored in encrypted or unencrypted form. Regardless of the nature of the data, preventing the data from being overwritten might be difficult because the memory device would be separate from the smart-card device 100. The data in the memory could be protected from being overwritten by making the memory device a dedicated read-only memory ("ROM") device. However, this approach would prevent the data in the memory device from being updated as needed by someone who is authorized to do so.

There is therefore a need for a system and method for preventing data stored in an integrated memory device that is packaged with a smart-card device from being overwritten without authorization, and for allowing authorized updating of the read-only data.

DETAILED DESCRIPTION

Figure 1:
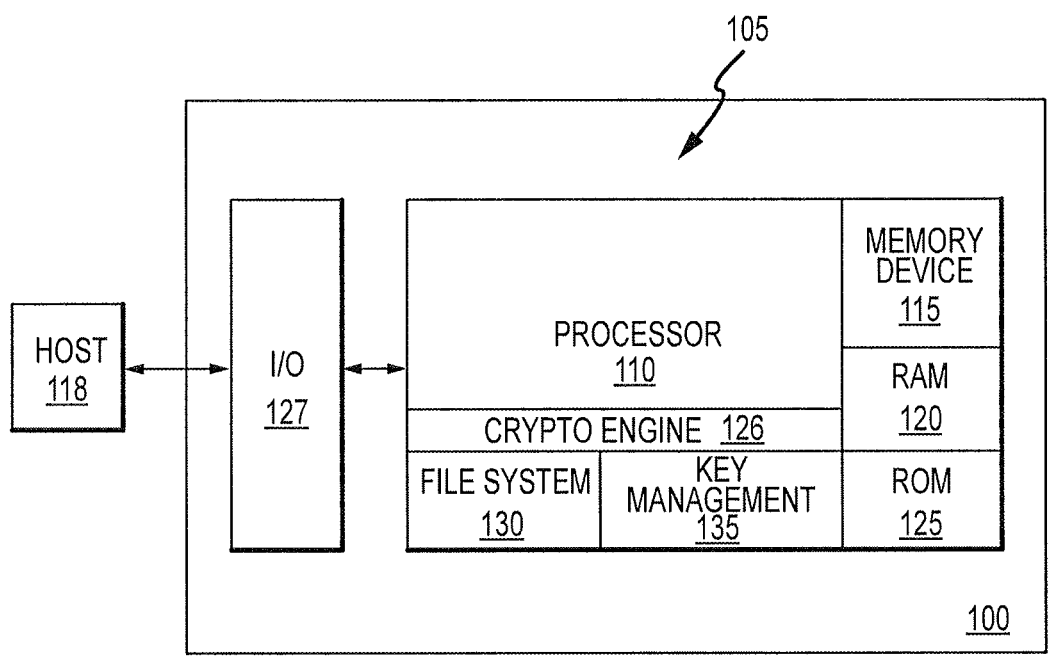
FIG. 1 is a block diagram of one embodiment of a prior art integrated smart-card device.
Figure 2:
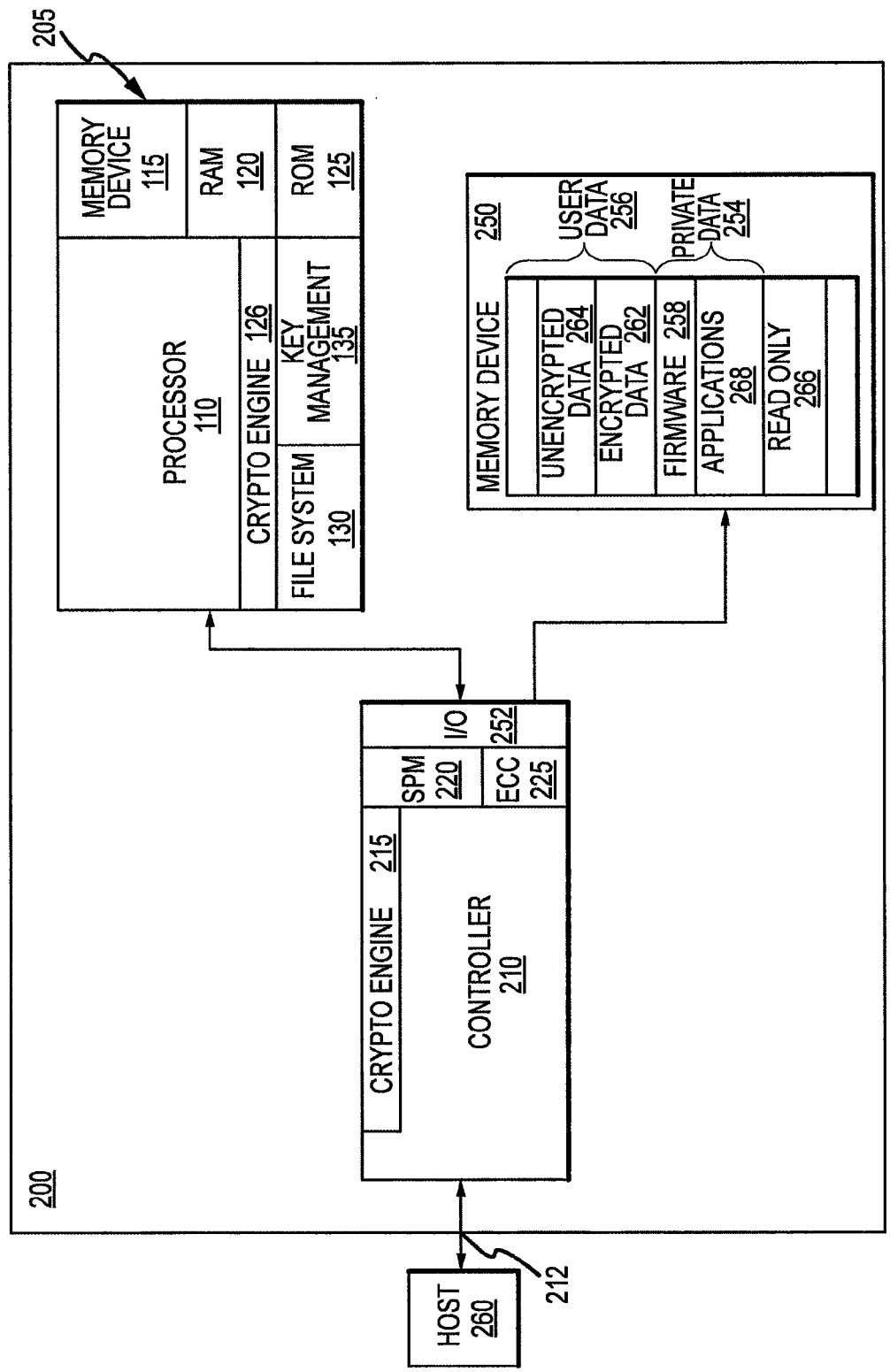
FIG. 2 is a block diagram of a storage device according to an embodiment of the invention in which an integrated smart-card device and a memory device are connected to each other and an access port through a controller.

FIG. 2 is a block diagram illustration of a storage device 200, e.g., a smart storage device, according to an embodiment of the invention. Many of the components used in the storage device 200 are the same or substantially the same as components are used in the smart-card device 100 shown in FIG. 1. Therefore, in the interest of brevity, an explanation of these components will not be repeated, and the same reference numerals will be used in FIG. 2. The storage device 200 may include a smart-card device 205 having components similar to those of smart-card device 100, such as access control circuitry and integrated memory, e.g., for authenticating a user to storage device 200, storing and managing one or more encryption and/or decryption keys, such as AES keys, private keys, etc. Although the term "smart-card" device may be used herein to describe all of the components shown in the smart-card device 205 of FIG. 2, it will be understood that various components may be omitted without preventing the smart-card device 205 from functioning as a smart-card device.

Storage device 200 may include a separate controller 210, such as a memory controller, e.g., a flash memory controller, through which signals are coupled between an access port 212 and the smart-card device 205. In one embodiment, the smart-card device 205 and the controller 210 may be integrated separately on separate chips disposed on a circuit board. The access port 212 may be connected to a host 260 that may be, for example, a personal computer. Alternatively, the host 260 may be a card reader or some other device that is in communication with a personal computer or other device.

In the storage device 200 embodiment shown in FIG. 2, the controller 210 includes a cryptography engine 215, such as cryptography engine, e.g., an AES cryptography engine. The controller 210 may include space management sector system 220 to manage the address space of a non-volatile memory device 250 with which the controller 210 is connected, and it may include an error correction engine 225, for correcting any data retention errors that may be present in data read from the memory device 250. In one embodiment, the memory device 250 is integrated separately on a separate chip from the smart-card device 205 and the controller 210, although the memory device 250, smart-card device 205 and controller 210 are packaged together in, for example, a package similar to a USB flash drive or a credit card. The nature of the access port 212 will depend upon the nature of the other device with which it is used. The access port 212 may be an electronic port, such as a USB connector, a magnetic signal port, such as the type commonly used in access control cards, an optical port, a wireless port, or any other type of port that can allow communication between the storage device 200 and another device.

The non-volatile memory device 250 may be a flash memory device, e.g., a NAND flash memory device, and it is connected to the controller 210 via an input/output interface 252, such as a flash memory interface. The input/output interface 252 may include a combined command/address bus, and a bi-directional data bus, as is typical for flash memory devices. The interface 252 may, of course, use other types of communications links, such as a high-speed link with one or more lanes through which all signals are coupled, or a more conventional memory device bus system including a command bus through which memory commands are coupled from the controller 210 to the memory device 250, an address bus through which addresses are coupled from the controller 210 to the memory device 250, and a data bus over which write data are transmitted from the controller 210 to the memory device 250 and read data are received by the controller 210 from the memory device 250.

The memory device 250 may be divided into a plurality of partitions, such as a private data partition 254, which may or may not be accessible to a user, and a user data partition 256, which is accessible to the user. In one embodiment, the private data partition 254 may include a firmware partition 258 that contains firmware for controlling operations on a memory array of the memory device 250 in response to control and address signals from the controller 210. In another embodiment, the private data portion 254 may include an applications partition 268 that stores smart-card applications, such as electronic transaction applications, electronic banking applications, telephone applications, etc., that might otherwise be stored in the non-volatile memory 115 of the smart-card device 205. Storing smart-card applications in the memory device 250 instead of in the non-volatile memory 115 facilitates a reduction of the memory requirements of the non-volatile memory 115 and thus the size of the non-volatile memory 115 that would otherwise be required when these applications are stored in the smart-card device 205. In addition, storing smart-card applications in the memory device 250 enables the storage of larger and more sophisticated smart-card applications and the storage of a larger number of applications compared to when smart-card applications are stored in the non-volatile memory 115 of the smart-card device 205. In one embodiment, the applications may be stored in the memory device 250 during fabrication of the memory device 250. In another embodiment, the applications data and/or other data may be encrypted before they are stored in the memory device 250. For this reason, the user data partition 256 may be partitioned into an encrypted data partition 262 storing data in encrypted form, and a unencrypted data partition 264 storing data in unencrypted form. Finally, the private data partition 254 may include a read-only partition 266.

The data stored in the read-only partition 266 may be application programs that are executed by the host 260 that is connected to the storage device 200. The application programs include an auto execute command so that they are automatically executed on the host 260 either when the storage device is connected to the host 260 or another device or when a user logs onto an operating system running on the host 260. Alternatively or in addition, the application programs stored in the read-only partition 266 may be executed by the processor 110 in the smart-card device 205 or by some other processor. Finally, the data stored in the read-only partition 266 may be data that is used by either the host 260, the processor 110 in the smart-card device 205 or by some other device either in the storage device 200 or outside the device 200. For example, the data may specify the characteristics of the memory device such as its storage capacity or file structure, which may be needed by other devices, such as the host or the space management sector system 220 in the controller 210.

During use, it may be necessary to authenticate the storage device 200, and, if so, to authenticate the storage device 200 at various levels. For example, there may be a user level of authentication that allows access to the user data partitions 256, and supervisor level of authentication that allows access to the applications partition 268 as well as the user data partitions 256, and an administrator level that allows access to all levels of the memory device 250, including the read-only partition 266.

There are basically two ways to authenticate the storage device 200. If the host 260 to which the storage device 200 is connected is a personal computer or the like, the user may log onto an operating system, such as Microsoft Windows® Vista®. In doing so, the user will enter a PIN, password or other identifier into the host 260. There may be multiple levels of PIN, password or other identifier corresponding to different levels of authorization. The host 260 then provides the PIN, password or other identifier and a series of specific commands to the controller 210 in the storage device 200, and the controller passes the PIN, password or other identifier to the smart-card device 205 for verification to authenticate the user. The smart-card device 205 compares the PIN, password or other identifier entered through the host 260 with a corresponding PIN, password or other identifier stored in the non-volatile memory 115 or the key management system 135 of the smart-card device 206. The smart-card device 205 may then transmit an authentication signal to the host 260 indicating whether or not the identifier is correct and thus whether or not the user is authenticated. The authentication signal ultimately places the smart-card device 205 and the controller 210 in an authorized state. If there are multiple authentication levels, the authentication signal ultimately places the smart-card device 205 and the controller 210 at the authorization level corresponding to the PIN, password or other identifier.

As mentioned above, there is a way to authenticate the storage device 200 other than by logging onto an operating system running on the host 260. The other way is used when the storage device 200 is placed in communication with a terminal or other device. In such case, an auto-execute application stored in the read-only partition 266 of the memory device 250 is executed by a processor in the terminal or other device. The application causes a display screen or other user interface device to request the entry of a PIN, password or other identifier. A user responds by entering the PIN, password or other identifier into a keyboard, keypad or other user interface device in the terminal or other device. The terminal or other device then sends the PIN, password or other identifier to the smart-card device 205, which uses it to authenticate the user in the manner described above. The smart-card device 205 may then transmit an authentication signal to the terminal or other device indicating whether or not the identifier is correct and thus whether or not the user is authenticated.

Once the smart-card device 205 and the controller 210 have been authenticated, the smart-card device 205 may send an encryption key to the cryptography engine 215 so it can encrypt data received from through the access port 212 and stored in the memory device 250. The data will then be stored in the memory device 250, such as in the encrypted data partition 264 of the memory device 250. The cryptography engine 215 may also receive from the smart-card device 205 a decryption key that it will use to decrypt data read the memory device 250 so that the data will be output from the access port 212 in unencrypted form. The cryptography engine 215 thus performs encryption and/or decryption using the one or more encryption and/or decryption keys from smart-card device 205 independently of the cryptography engine 126 of the smart-card device 205.

As the storage device 200 is used, it may become necessary to update the data stored in the private data partitions 254 of the memory device 250. For example, it may be necessary to add or update smart-card applications stored in the applications partition 268 and/firmware stored in the firmware partition 258. It may also be necessary at times to update the data stored in the read-only partition 266 even though the storage device 200 is configured to prevent the data stored in the read-only partition 266 from being overwritten. In one embodiment, the data stored in the read-only partition 266 are updated by the host 260 sending a command uniquely corresponding to the function of updating the read-only partition 266. The command may be accompanied by a PIN, password or other identifier corresponding to an authorization level that would be required to update the read-only partition 266. Alternatively, the storage device 200 may be already set to an authorized state. The command sent by the host 260 is received by the controller 210, which sends it on to the smart-card device 205. The smart-card device may validate the command by determining if the authorization state of the smart-card device 205 is at a level that would allow the data stored in the read-only partition 266 to be overwritten. If so, the smart-card device will send to the controller 210 a "success" status word indicating that the read only partition 266 should be opened up for writes. The controller 210 responds to the "success" status word by changing the attributes of the read-only partition 266 from "read-only" to "read/write." Once the controller 210 has changed the attributes of the read-only partition 266 to "read/write," the partition 266 is open to being written. The storage device 200 can then accept data to be written to the read-only partition 266 from the host 260 or other device. The controller 210 also applies the "success" status word to the host 260 through the access port 212 to indicate to the host that it can proceed with the update of the data stored in the read-only partition 266. The data may originate from a variety of sources, including a media drive in the host 260, such as a CD drive, the Internet or some other source.

If the smart-card device 205 is not in an authorized state or is not at a sufficient authorization level when the command is received, it will respond by sending a "fail" status word to the controller 210. The controller 210 will respond to any attempt to write data to the read-only partition 266 with a write protect message, and it will not carry out the command.

When the host 260 or other device has completed writing data to the read-only partition 266, the host 260 or other device sends an appropriate command to the controller 210. The controller 210 passes the command on to the smart-card device 205 and changes the attributes of the read only partition 266 from "read/write" to "read-only." The controller 210 thus closes the read-only partition 266 to further writing.

If the controller 210 determines that the size of the data to be written to the read-only partition is larger than the read-only partition, the controller 210 will first resize the partition 266 and then proceed.

Figure 3:
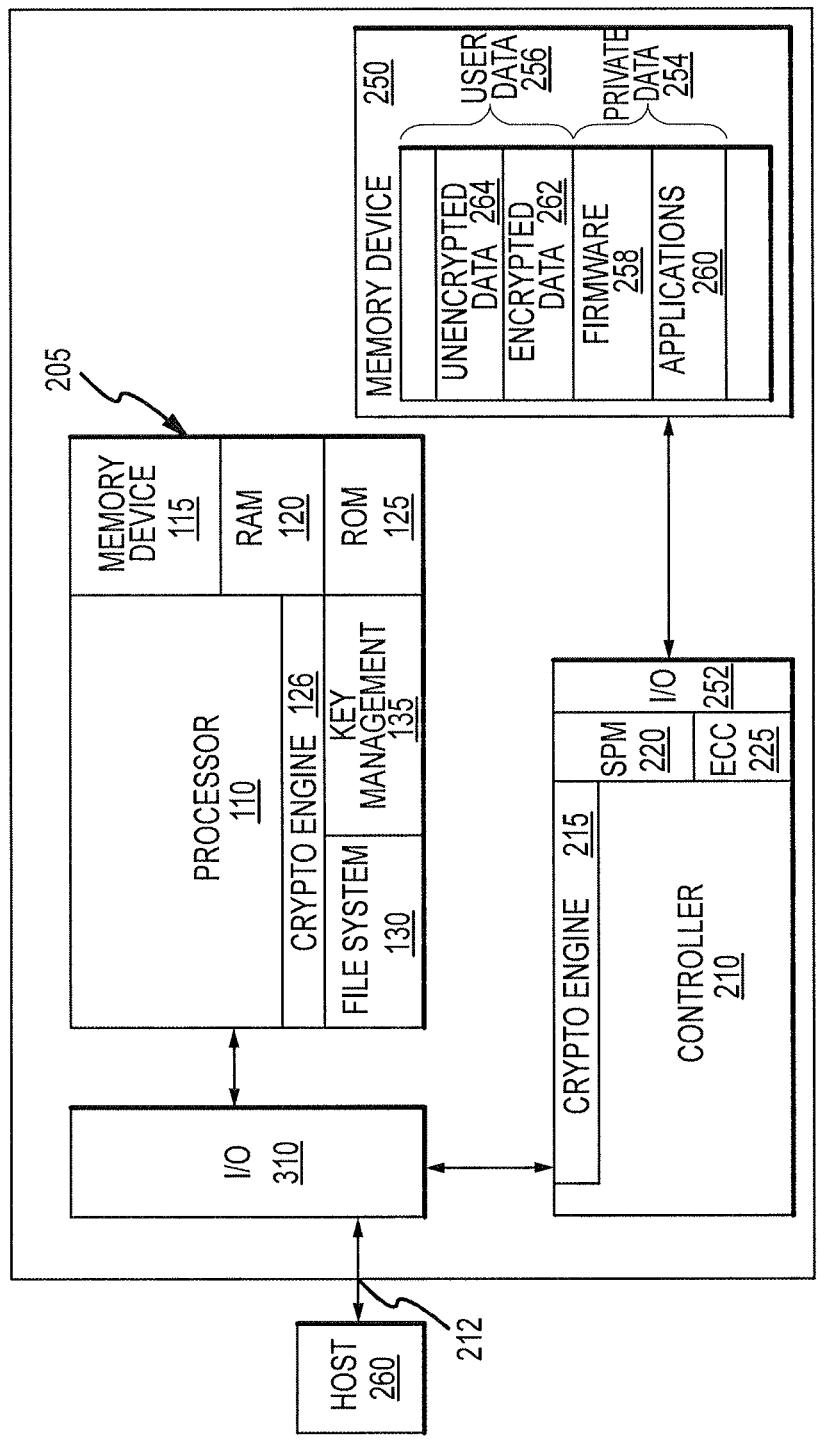
FIG. 3 is a block diagram of a storage device according to another embodiment of the invention in which an integrated smart-card device and a controller that is connected to a memory device are connected to each other and an access port through an input/output interface.

Another embodiment of a storage device 300 is shown in FIG. 3. Many of the components used in the storage device 300 are the same or substantially the same as components are used in the smart-card device 200 shown in FIG. 2. Therefore, in the interest of brevity, an explanation of these components will not be repeated, and the same reference numerals will be used in FIG. 3. The storage device 300 differs from the storage device 200 by using an input/output ("I/O") interface 310 to couple the access port 212 to both the smart-card device 205 and the controller 210 instead of using the controller 210 to couple the access port 212 to the smart-card device 205. The I/O interface 310 is used to route signals between the Smart-Card device 205 and the access port 212 in the same manner that the I/O interface 127 in the storage device 100 of FIG. 1 is used. The I/O interface 310 is also used to couple the cryptography keys and other signals from the smart-card device 205 to the controller 210. The I/O interface 310 may monitor and couple to the controller 210 signals coupled between the access port 212 and the smart-card device 205 to allow the controller 210 to perform the functions describe above by monitoring the signals coupled through the controller between the access port 212 and the smart-card device.

From the foregoing it will be appreciated that, although specific embodiments of the invention have been described herein for purposes of illustration, various modifications may be made without deviating from the spirit and scope of the invention. For example, the term "smart-card device" may include a device containing all of the components in the smart-card device 205. However, various components may be omitted from a device without preventing the device from being considered a smart-card device. For example, the RAM 120 and the ROM 125 may be omitted, and the data that would normally be stored in both the RAM 120 and the ROM 125 may be stored in the memory device 115. Additionally, the file system 130, key management system 135 and cryptography engine 126 may be omitted. A smart-card device will generally have some type of processor, which need not be a full-features processor such as a microprocessor. A reduced capability processor, such as a controller, may be used in some embodiments. A smart-card device will generally also have some type of non-volatile storage, such as the memory device 115. However, the storage need not be separate from the processor 110 and may, in some embodiments, be integrated in the processor 110. Accordingly, the invention is not limited except as by the appended claims.

What is claimed is:

1. An apparatus, comprising:
   a non-volatile memory configured to store data, the memory having a read-only partition;
   a controller coupled to the non-volatile memory, the controller configured to change an attribute of the read-only partition from read-only to read/write responsive, at least in part, to opening the read-only partition to writing, the controller further configured to determine a size of the read-only partition and a size of data to be written to the read-only partition, compare the size of the read-only partition to the size of the data to be written, and execute a resizing command to resize the read-only partition prior to changing the attribute of the read-only partition to read/write if the controller determines that the size of data to be written to the read-only partition exceeds the size of the read-only partition; and
   an integrated circuit device coupled to the controller and configured to provide an indication to the controller to open the read-only partition to writing responsive to a command to open the read-only partition to writing.

2. The apparatus of claim 1, wherein the controller is further configured to close the read-only partition to writing responsive, at least in part, to completion of writing to the read-only partition.

3. The apparatus of claim 2, wherein the controller is configured to close the read-only partition to writing, at least in part, by changing the attribute of the read-only partition from read/write to read-only.

4. The apparatus of claim 1, wherein the read-only partition of the memory device includes instructions for execution of an application.

5. The apparatus of claim 1, wherein the integrated circuit device is further configured to provide the controller the command to open the read-only partition to writing responsive, at least in part, to the integrated circuit device operating in an authorized state.

6. The apparatus of claim 1, wherein the controller comprises a cryptography engine configured to encrypt the data to be written to the read-only partition.

7. The apparatus of claim 1, further comprising an access port coupled to the controller, wherein the access port is configured to be coupled to a host.

8. The apparatus of claim 7, wherein the access port is further configured to provide the data from the host to the controller for encryption by a cryptography engine included with the controller.

9. The apparatus of claim 7, wherein the access port is further configured to provide decrypted data from the controller to the host.

* * * * *